(12) United States Patent
Wuehler

(10) Patent No.: US 9,906,513 B2
(45) Date of Patent: Feb. 27, 2018

(54) NETWORK AUTHORIZATION SYSTEM

(71) Applicant: Bank of America Corporation, Charlotte, NC (US)

(72) Inventor: Michael Wuehler, New York City, NY (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 14/867,824

(22) Filed: Sep. 28, 2015

(65) Prior Publication Data

US 2017/0093830 A1  Mar. 30, 2017

(51) Int. Cl.
*H04L 29/06* (2006.01)
*H04L 9/08* (2006.01)
*H04L 9/32* (2006.01)

(52) U.S. Cl.
CPC .............. *H04L 63/08* (2013.01); *H04L 9/083* (2013.01); *H04L 9/0861* (2013.01); *H04L 9/3236* (2013.01); *H04L 63/0442* (2013.01)

(58) Field of Classification Search
CPC ..... H04L 63/08; H04L 63/0442; H04L 9/083; H04L 9/0861; H04L 9/3236; G06Q 20/06; G06Q 20/10; G06Q 20/08
See application file for complete search history.

(56) References Cited

U.S. PATENT DOCUMENTS

| 7,802,090 | B2 | 9/2010 | Bansal |
| 7,881,470 | B2 | 2/2011 | Tan et al. |
| 8,295,489 | B2 | 10/2012 | Sung et al. |
| 2004/0131187 | A1* | 7/2004 | Takao ................. H04L 63/0428 380/255 |
| 2005/0271210 | A1* | 12/2005 | Soppera ............... H04L 9/0836 380/277 |
| 2010/0161817 | A1* | 6/2010 | Xiao ..................... H04L 63/126 709/229 |
| 2013/0124859 | A1* | 5/2013 | Pestoni ................. H04L 9/0825 713/163 |
| 2016/0254910 | A1* | 9/2016 | Finlow-Bates ....... H04L 9/0891 713/158 |
| 2017/0116693 | A1* | 4/2017 | Rae ........................ G06F 21/64 |

OTHER PUBLICATIONS

Andreas M. Antonopoulos, "Mastering Bitcoin" 2015, O'Reilly, Pages Chapters 1-7.*
"Application of the Blockchain for Authentication and Verification of Identity" Cresitello-Dittmarr, Nov. 30, 2016. http://www.cs.tufts.edu/comp/116/archive/fall2016/bcresitellodittmar.pdf.*

* cited by examiner

*Primary Examiner* — Catherine Thiaw
*Assistant Examiner* — Thomas Ho
(74) *Attorney, Agent, or Firm* — Michael A. Springs

(57) ABSTRACT

A system includes a key repository and a network node. The key repository is configured to generate a private key and a public key of the network node, to communicate the private key and the public key to the network node, to verify whether the network node is authorized to operate on a network, to generate a first message indicating whether the network node is authorized to operate on the network, to encrypt the first message using the public key, and to communicate the encrypted first message to the network node. The network node is configured to decrypt the encrypted first message using the private key, to generate a second message based on the first message, to encrypt the second message using the private key, and to record the encrypted second message to a ledger.

20 Claims, 4 Drawing Sheets

NETWORK AUTHORIZATION SYSTEM

TECHNICAL FIELD

This disclosure relates generally to a system for determining and managing network authorization.

BACKGROUND

A network may include one or more nodes. New nodes may also be added to the network. When a new node is added to the network, the new node may become an entry point for malware, viruses, and malicious intrusions, which may put the security of the network and the security of other nodes on the network at risk.

SUMMARY OF THE DISCLOSURE

According to one embodiment, a system includes a key repository and a network node. The key repository is configured to generate a private key and a public key of the network node and to communicate the private key and the public key to the network node. The key repository is further configured to verify whether the network node is authorized to operate on a network and to generate a first message indicating whether the network node is authorized to operate on the network. The key repository is also configured to encrypt the first message using the public key and to communicate the encrypted first message to the network node. The network node is configured to decrypt the encrypted first message using the private key and to generate a second message based on the first message. The second message indicates whether the network node is authorized to operate on the network. The network node is also configured to encrypt the second message using the private key and to record the encrypted second message to a ledger. The ledger is searchable using the public key to return the encrypted second message.

According to another embodiment, an apparatus includes a memory and a processor. The processor is configured to generate a private key and a public key of a network node and to communicate the private key and the public key to the network node. The processor is further configured to verify whether the network node is authorized to operate on a network and to generate a first message indicating whether the network node is authorized to operate on the network. The processor is also configured to encrypt the first message using the public key and to communicate the encrypted first message to the network node. The network node is configured to decrypt the encrypted first message using the private key and to generate a second message based on the first message. The second message indicates whether the network node is authorized to operate on the network. The network node is further configured to encrypt the second message using the private key and to record the encrypted second message to a ledger. The ledger is searchable using the public key to return the encrypted second message.

According to another embodiment, a method includes generating a private key and a public key of a network node and communicating the private key and the public key to the network node. The method further includes verifying whether the network node is authorized to operate on a network and generating a first message indicating whether the network node is authorized to operate on the network. The method also includes encrypting the first message using the public key and communicating the encrypted first message to the network node. The method further includes decrypting the encrypted first message using the private key and generating a second message based on the first message. The second message indicates whether the network node is authorized to operate on the network. The method also includes encrypting the second message using the private key and recording the encrypted second message to a ledger. The ledger is searchable using the public key to return the encrypted second message.

Certain embodiments may provide one or more technical advantages. For example, an embodiment may improve network security. As another example, an embodiment may improve the security of communications sent over the network. As yet another example, an embodiment may reduce and/or prevent communications with a network node that is not authorized to operate over the network. As yet another example, an embodiment may improve and/or maintain the security of a network when a new node is added to the network. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
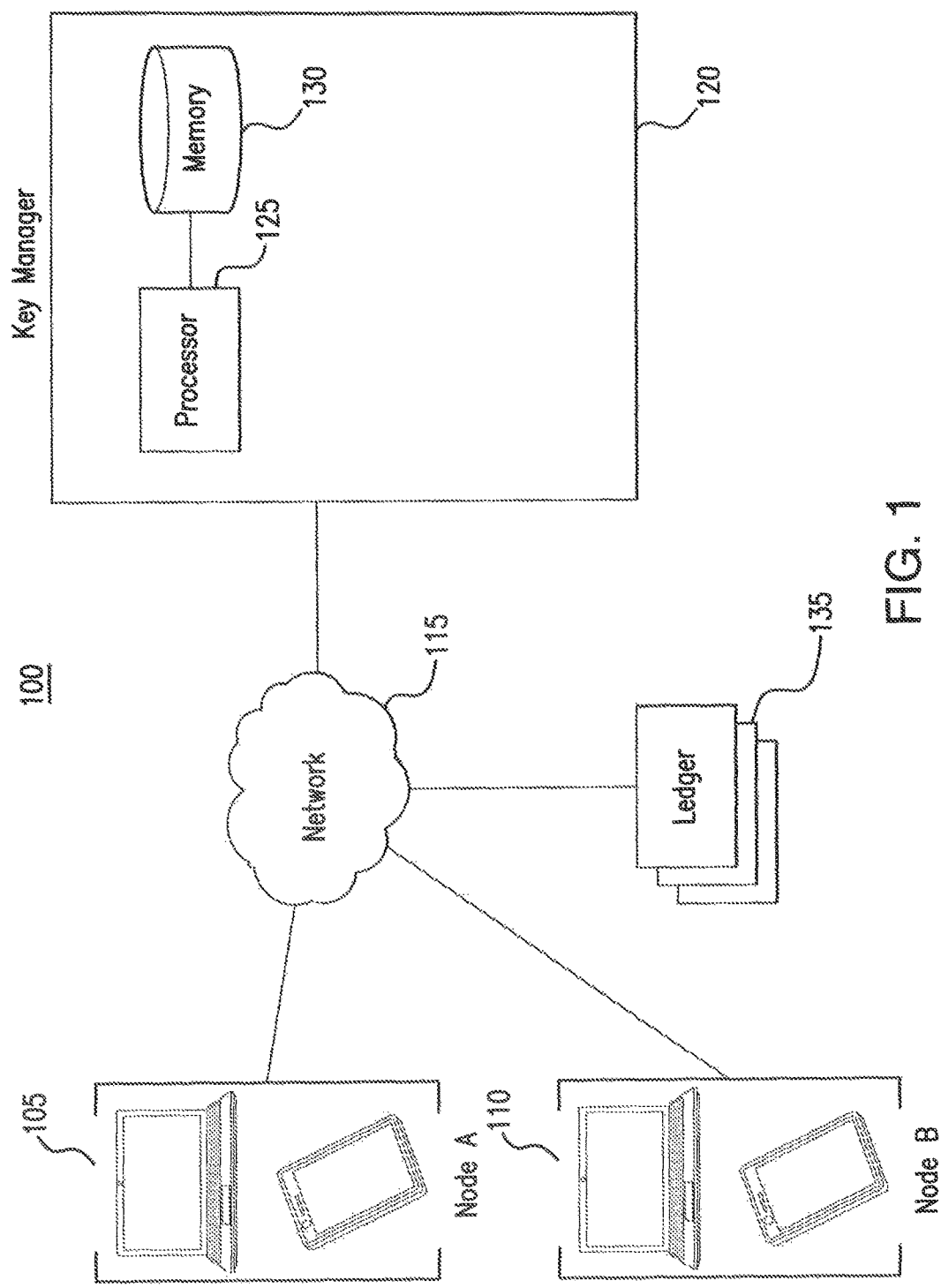
FIG. 1 illustrates a system for network authorization.

Embodiments of the present disclosure and its advantages are best understood by referring to FIGS. 1 through 4 of the drawings, like numerals being used for like and corresponding parts of the various drawings.

The security of a computer network is important to the functioning of the network. If a network is not secure, then any number of types of intrusions and/or malware may jeopardize the core functionality of the network or any user device on the network. Therefore, maintaining the security of the network is a problem inherent to computer networks such as the Internet and is important to the functioning of the network itself. When a new device or service is added to a network, that device or service introduces a risk to the security of the network. For example, the new device may be an entry point for intrusions and/or malware that could affect other devices on the network. As another example, a new service may also be an entry point for malware and/or hackers. Therefore, the security of a network is placed at risk when a new device or service is added to the network.

As an illustrative example, in a corporate or business setting, employees, guests, clients, and their family and friends may all try to connect their personal laptops, mobile phones, tablets, etc. to the corporate or business network. In some instances, the connections could be for work purposes, but often the connections are for personal use. When these devices connect and communicate over the network, they may expose the network and other devices connected to the network to viruses, malware, intrusions, and/or hacks. For example, a personal laptop with a worm or malware installed may immediately spread the worm or malware to other devices on the network once the laptop connects to the network. As another example, the personal laptop may also act as an entry point for hackers to attack the network if the laptop does not have the proper security software installed on it.

This disclosure contemplates a system that maintains and/or improves network security when a new device and/or service is added to the network. Before allowing the new device or service to communicate over the network, the system may first verify whether the device or service is secure and/or compliant. The system may issue the new device or service a public encryption key and a private encryption key. The system may then communicate a message to the new device or service indicating whether it is safe for the device or service to operate on the network. That message may be encrypted using the issued private encryption key. When the new device or service receives the encrypted message, the new device or service may decrypt the encrypted message using its issued private encryption keys. The new device or service may then send another encrypted message to a ledger such as a block chain on the network. That encrypted message may indicate whether it is safe to communicate and/or operate with the new device or service.

When an existing device or service wants to communicate with the new device or service, the existing device or service may search the ledger using the public key of the new device or service. The search may return the encrypted message that the new device or service placed in the ledger. The existing device or service may then decrypt that message using the public key of the new device or service. The decrypted message will indicate to the existing device or service whether it is safe to communicate or operate with the new device or service. Based on that message, the existing device or service can determine whether to communicate or operate with the new device or service.

When any changes (e.g., new operating system install, new patch install) occur in the new device or service that may introduce a risk to the network, the system may re-verify whether the new device or service is safe and/or compliant. The system may send a second message to the new device or service that indicates whether the new device or service is safe and/or compliant. Then as previously described, the new device or service may decrypt and encrypt the message and write an encrypted message to the ledger to update whether it is safe or compliant.

Figure 2:
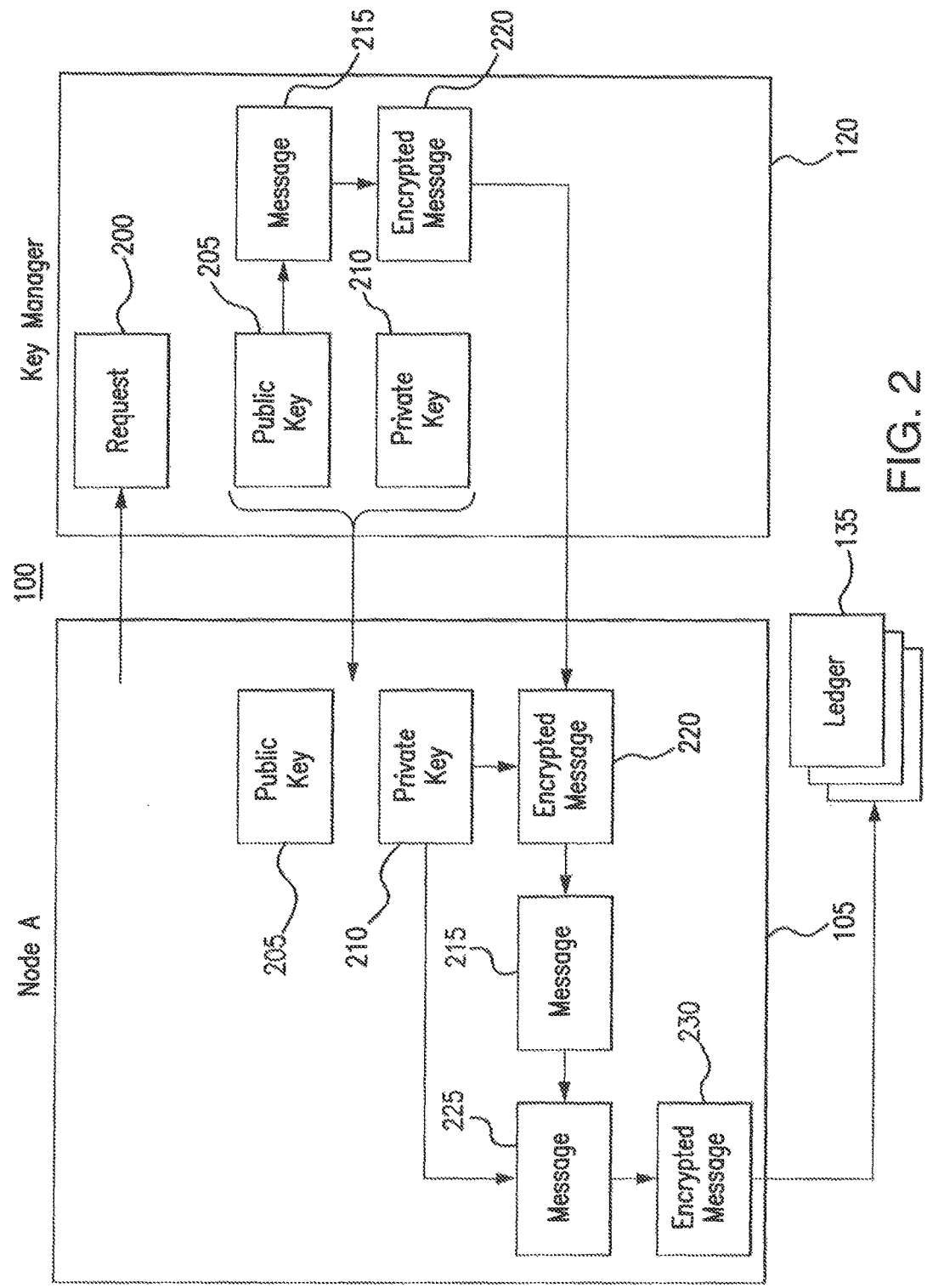
FIG. 2 illustrates the system of FIG. 1 adding a network node.
Figure 3:
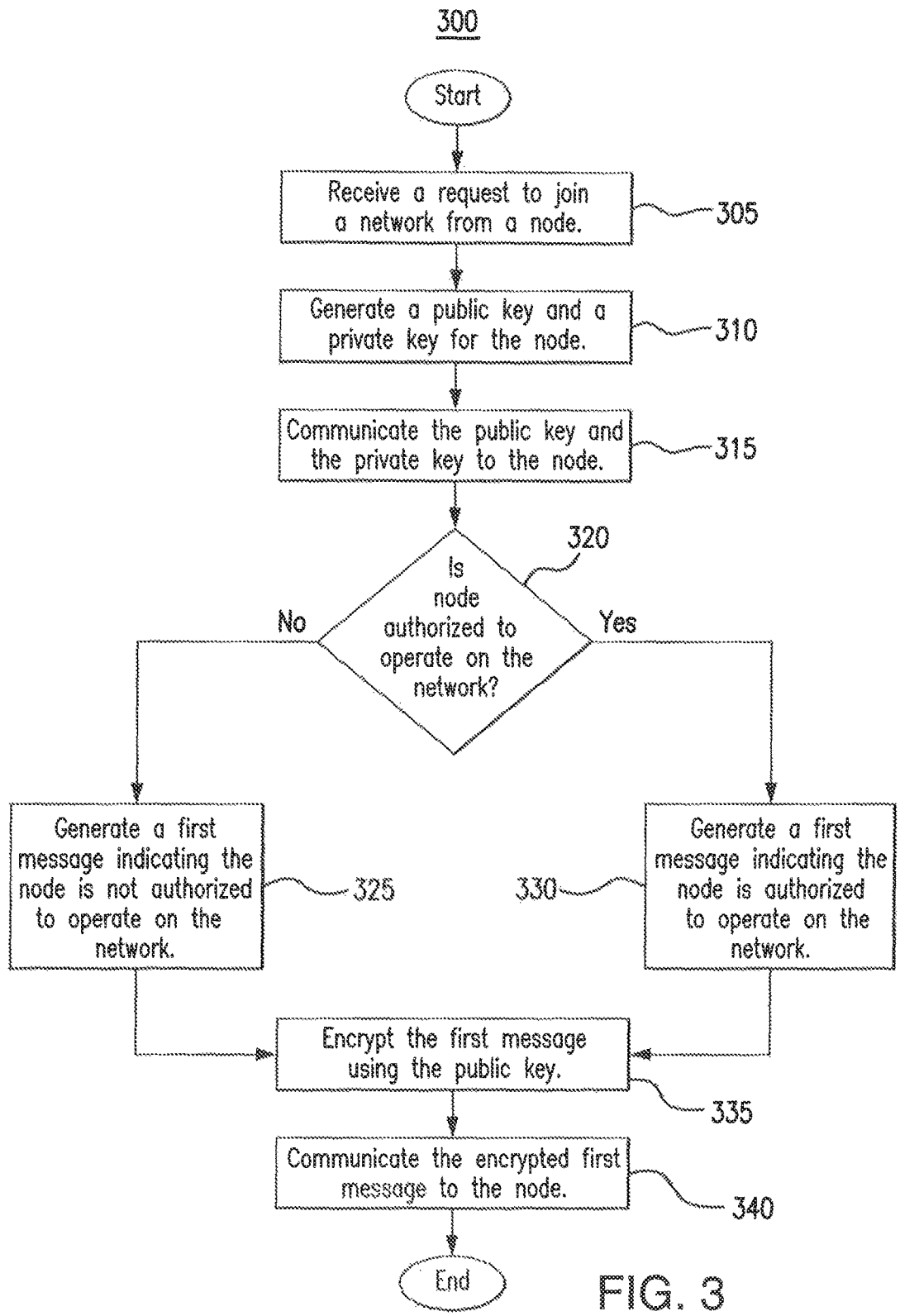
FIG. 3 is a flowchart illustrating a method for adding a network node using the system of FIG. 1.
Figure 4:
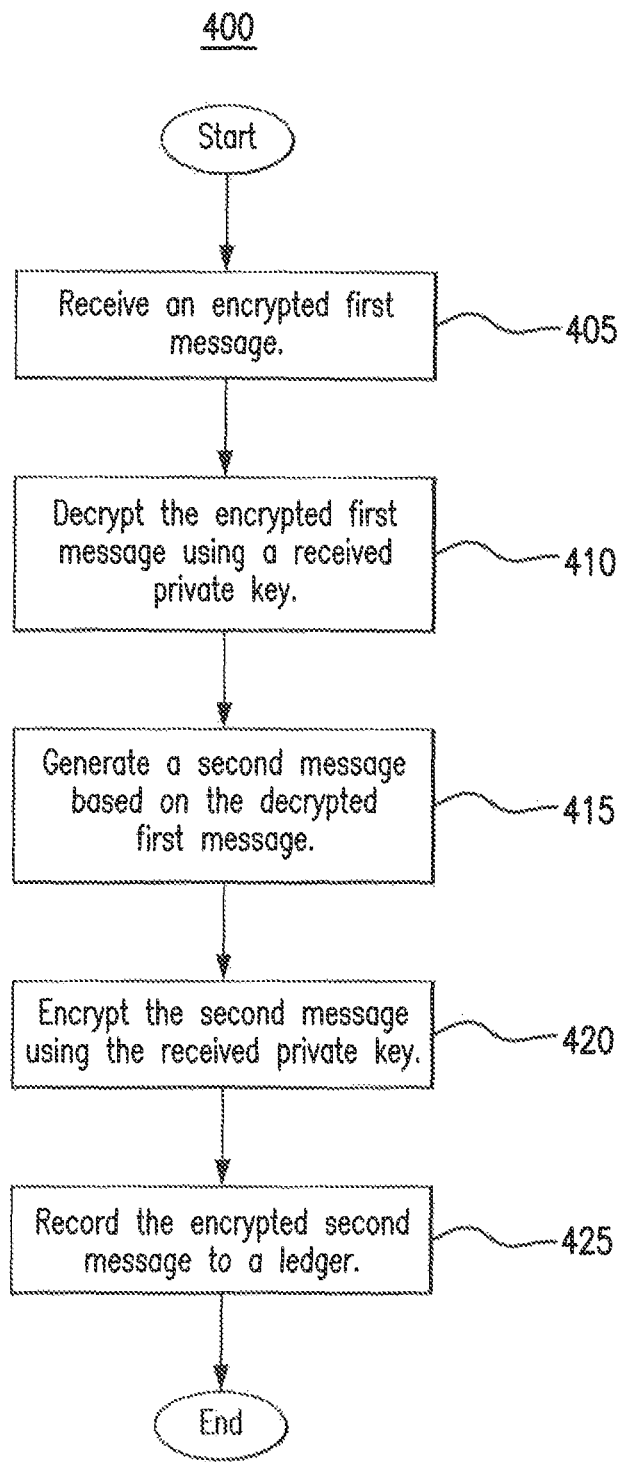
FIG. 4 is a flowchart illustrating a method for adding a network node using the system of FIG. 1.

In this manner, the system may improve and/or maintain the security of the network when a new device or service is added to the network and when an existing device or service changes. The system will be described in more detail using FIGS. 1 through 4. FIG. 1 presents a general overview of the system. FIG. 2 describes the operation of the system. FIGS. 3 and 4 are flowcharts illustrating the operation of the system.

FIG. 1 illustrates a system 100 for network authorization. As provided in FIG. 1, system 100 includes a node A 105, a node B 110, a network 115, a key manager 120, and a ledger 135. Nodes 105 and 110 may communicate with key manager 120 and ledger 135 through network 115. This disclosure contemplates system 100 including any number of nodes. In particular embodiments, system 100 may improve and/or maintain the security of network 115 when a node is added to system 100.

Node A 105 and node B 110 may be any device or service. For example, nodes 105 and 110 may be user devices such as laptops and/or mobile phones that communicate over network 115. As another example, nodes 105 and 110 may be servers configured to offer a service to user devices on network 115. When a node such as node A 105 is added to system 100, the security of network 115 may be put at risk. For example, if node A 105 does not have an appropriate antivirus and/or operating system installed, node A 105 may become an entry point for intrusions and/or malware that may disrupt network 115 and/or other devices and services on network 115. As another example, if node A 105 is associated with a malicious user account, allowing node A 105 to operate over network 115 may expose other components of system 100 to security risks. As yet another example, if node A 105 is not registered with a central encryption and/or antivirus service, node A 105 may expose other components of system 100 to malware and/or viruses.

When node 105 requests to join system 100 and/or network 115, key manager 120 may verify whether node 105 is authorized to operate over network 115. For example, key manager 120 may execute one or more scripts that determine whether it is safe for other components of system 100 to communicate with node 105. Key manager 120 may then issue public and private encryption keys to node 105 and communicate a message to node 105 indicating whether node 105 is authorized to operate on network 115. Node 105 may then write that message to ledger 135. Before another component of system 100 communicates with node 105, that component may search ledger 135 for the message to determine whether it is safe to communicate with node 105. In this manner, node 105 may be added to network 115 while maintaining and/or improving the security of network 115.

This disclosure contemplates nodes 105 and 110 being any appropriate device or service that can communicate over network 115. For example, nodes 105 and 110 may be a computer, a laptop, a wireless or cellular telephone, an electronic notebook, a personal digital assistant, a tablet, a server, a mainframe, or any other device capable of receiving, processing, storing, and/or communicating information with other components of system 100. Nodes 105 and 110 may also include a user interface, such as a display, a microphone, keypad, or other appropriate terminal equipment usable by a user. In some embodiments, an application executed by nodes 105 and 110 may perform the functions described herein.

Network 115 may facilitate communication amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Key manager 120 may generate and/or issue public and private encryption keys for various components of system 100 such as, for example, node A 105 and node B 110. Key manager 120 may also execute one or more scripts to verify whether a component of system 100 is authorized to operate over network 115. As illustrated in FIG. 1, key manager 120 may include a processor 125 and a memory 130. Processor 125 may be communicatively coupled to memory 130. This disclosure contemplates processor 125 and memory 130 being configured to perform any of the functions of key manager 120 described herein.

Processor 125 may execute software stored on memory 130 to perform any of the functions described herein. Processor 125 may control the operation and administration of key manager 120 by processing information received from network 115, nodes 105 and 110, and memory 145. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

When a new node such as a user device and/or service requests to join network 115, key manager 120 may receive a request from the new node. In response to receiving the request, key manager 120 may execute one or more scripts to determine whether the new node is authorized to communicate over network 115. Key manager 120 may also issue public and private encryption keys to the new node. Key manager 120 may then communicate an encrypted message to the new node indicating whether the new node is authorized to communicate over network 115. The encrypted message may be encrypted using the new node's public key.

Before an existing node of system 100 communicates with the new node, the existing node may request the public key of the new node from key manager 120. In response to that request, key manager 120 may communicate the public key of the new node to the existing node. The existing node may then use the public key to search ledger 135 to determine whether the new node is authorized to operate over network 115. If the new node is authorized to communicate over network 115, the existing node may begin communicating with the new node.

Ledger 135 may store encrypted messages that indicate whether certain components of system 100 are authorized to communicate over network 115. In certain embodiments, ledger 135 may be a block chain. When a new node joins network 115, the new node may communicate an encrypted message to ledger 135 indicating whether the new node is authorized to communicate over network 115. Ledger 135 may store this encrypted message. Before an existing node communicates with the new node, the existing node may search ledger 135 using a public key of the new node. Based on that search, ledger 135 may return the encrypted message written by the new node to ledger 135. The existing node may then receive that encrypted message and decrypt that encrypted message using the public key of the new node. After decryption, the existing node may determine whether the new node is authorized to communicate over network 115.

In particular embodiments, system 100 may maintain and/or improve the security of network 115. For example, system 100 may prevent components of system 100 from communicating with a new node until the node has been authorized to operate over network 115. In this manner, the security of network 115 may be maintained or improved because other nodes of network 115 may not be exposed to a new node until the new node is authorized to communicate over network 115.

Modifications, additions, or omissions may be made to system 100 without departing from the scope of the invention. For example, key manager 120 may be a distributed server. As another example, the components of system 100 may be integrated or separated. For example, ledger 135 may be incorporated into key manager 120. Furthermore, system 100 may include any number of nodes.

FIG. 2 illustrates in more detail the operation of system 100. For the purpose of clarity, certain components of system 100 are not illustrated. However, their omission should not be construed as their removal from system 100. The components illustrated in FIG. 2 may operate to add a node (such as node A 105) to system 100.

When node A 105 is to be added, node A 105 may communicate a request 200 to key manager 120. Request 200 may indicate that node A 105 is requesting to be added to system 100 and/or network 115. Request 200 may include information about the configuration of node A 105. For example, request 200 may indicate an operating system version and a patch level of node A 105. As another example, request 200 may indicate the type of file system configured on node A 105. As yet another example, request 200 may indicate a type of security software installed on node A 105 and/or a user account associated with node A 105. Request 200 may also indicate a service that is connected to node A 105. In particular embodiments, node A 105 may generate request 200 by generating a hash of a kernel of node A 105. The kernel may include the configuration information of node A 105. Node A 105 may then communicate the hash to key manager 120 to identify node A 105 to key manager 120.

In response to receiving request 200, key manager 120 may examine the contents of request 200 to determine whether node A 105 is authorized to communicate over network 115. In certain embodiments, key manager 120 may execute one or more scripts to examine the contents of request 200 to determine whether node A 105 is authorized to communicate over network 115. This disclosure contemplates key manager 120 determining whether node A 105 is authorized to communicate over network 115 based on any appropriate characteristic or configuration of node A 105. For example, key manager 120 may make this determination based on an operating system, operating system version, and/or patch level of node A 105. If node A 105 does not have a particular operating system, operating system version, and/or patch level installed, then node A 105 may be vulnerable to certain types of malware and intrusions that could jeopardize network 115 or other nodes of network 115.

As another example, key manager 120 may make this determination based on a file system mounted on node A 105, security software installed on node A 105, and/or a service that is connected to node A 105. If node A 105 does not have an appropriate file system mounted, then the file system of node A 105 may be vulnerable to attack and may hide malware and viruses that escape detection. If node A 105 does not have appropriate security software installed, then node A 105 may be susceptible to hacks, intrusions, viruses, and malware. If node A 105 is not connected to appropriate services, then node A 105 may not receive services that protect node A 105 from intrusions and hacks.

As yet another example, key manager 120 may make this determination based on whether a user account is or is not associated with node A 105. For example, if node A 105 is associated with a malicious user account, then node A 105 should not be allowed to operate over network 115. As another example, if node A 105 is associated with a safe and/or administrative account, then node A 105 should be allowed to operate over network 115.

Key manager 120 may also generate and issue public key 205 and private key 210 in response to receiving request 200. Public key 205 and private key 210 may be encryption keys associated with node A 105. These keys are unique to node A 105 when compared to keys issued to other components of system 100. Public key 205 may be the encryption key used by components of system 100 other than node A 105 to encrypt and/or decrypt messages associated with node A 105. Private key 210 may be the encryption key used by node A 105 to encrypt and/or decrypt messages associated with node A 105. Key manager 120 may communicate public key 205 and private key 210 to node A 105. Key manager 120 may also store public key 205 after public key 205 has been communicated to node A 105. Before other components of system 100 communicate with node A 105, those components may request public key 205 from key manager 120.

Key manager 120 may generate a message 215 that indicates whether node A 105 is authorized to communicate over network 115. Message 215 may indicate to node A 105 and other components of system 100 whether node A 105 is authorized to communicate over network 115. Key manager 120 may encrypt message 215 using public key 205 to generate encrypted message 220. Key manager 120 may then communicate encrypted message 220 to node A 105 to inform node A 105 whether node A 105 is authorized to communicate over network 115.

Node A 105 may receive encrypted message 220 and decrypt encrypted message 220 using private key 210. After decryption, node A 105 may extract message 215 from encrypted message 220. Node A 105 may examine message 215 to determine whether it is authorized to communicate over network 115. Based on that determination, node A 105 may generate a message 225 that indicates whether node A 105 is authorized to communicate over network 115. In certain embodiments, message 225 may include a portion of message 215. Node A 105 may then encrypt message 255 using private key 210 to generate encrypted message 230.

Node A 105 may communicate encrypted message 230 to ledger 135. Ledger 135 may include a record of each component of system 100 that is authorized to communicate over network 115. Ledger 135 may also include a record of each component of system 100 that is not authorized to communicate over network 115. Ledger 135 may store encrypted message 230. Ledger 135 may be searchable using the public keys associated with the components of system 100. For example, if ledger 135 was searched using public key 205 then ledger 135 should return encrypted message 230 indicating whether node A 105 is authorized to communicate over network 115. In certain embodiments, each component of system 100 may store a local copy of ledger 135. When ledger 135 is updated, the update may be propagated to each local copy.

Before a component of system 100, such as node B 110, communicates with node A 105, that component may request public key 205 from key manager 120. Then that component may search ledger 135 using public key 205 to return encrypted message 230. That component may then decrypt encrypted message 230 using public key 205 to extract message 225. The component may then examine message 225 to determine whether node A 105 is authorized to communicate over network 115. If node A 105 is authorized to communicate over network 115, the component of system 100 may begin communicating with node A 105. If node A 105 is not authorized to communicate over network 115, the component may not communicate with node A 105.

In certain embodiments, key manager 120 may determine that a change occurred in node A 105. The change may present a risk to the security of system 100. In response to the determination that the change occurred, key manager 120 may verify whether node A 105 is still authorized to operate over network 115. Based on that determination, key manager 120 may then generate a message 215 that indicates whether node A 105 is still authorized to operate over network 115. Using the process described above, key manager 120 may then encrypt message 215 and communicate encrypted message 220 to node A 105. Node A 105 may then encrypt and decrypt encrypted message 220 and add encrypted message 230 to ledger 135. As a result, ledger 135 may be updated for any changes occurring in system 100.

FIGS. 3 and 4 are flowcharts illustrating methods for adding a network node to the system 100 of FIG. 1. In particular embodiments, by performing one or more of these methods, the security of network 115 may be maintained and/or improved.

FIG. 3 illustrates a method 300 for adding a network node using the system 100 of FIG. 1. In certain embodiments, key manager 120 may perform method 300. Key manager 120 may begin by receiving a request to join a network from a node in step 305. The request may indicate information concerning the configuration of the node. For example, the request may indicate an operating system version and/or a patch level of the node. As another example, the request may indicate a user account that is or is not associated with the node. As yet another example, the request may indicate security software installed on the node and/or a file system configured on the node.

Key manager 120 may then continue to step 310 to generate a public key and a private key for the node. The public key may be used by components of system 100 other than the node to encrypt and/or decrypt messages associated with the node. The private key may be used by the node to encrypt and/or decrypt messages associated with the node. In step 315, the key manager 120 may communicate the public key and the private key to the node. Key manager 120 may store a copy of the public key.

In step 320, key manager 120 may determine whether the node is authorized to operate on the network. In certain embodiments, key manager 120 may make this determination based on the information included in the request received in step 305. Key manager 120 may execute one or more scripts to analyze this information and to make the determination whether the node is authorized to operate on the network. If the node is not authorized to operate on the network, key manager 120 may continue to step 325 and generate a first message indicating the node is not authorized to operate on the network. If the node is authorized to operate on the network, key manager 120 may continue to step 330 to generate a first message indicating the node is authorized to operate on the network.

In step 335, key manager 120 may encrypt the first message using the public key. Key manager 120 may then communicate the encrypted first message to the node in step 340. Before an existing node communicates with the new node, the existing node may request the public key of the new node from key manager 120. Key manager 120 may communicate the public key to the existing node. The existing node may then search a ledger using the public key. The search should return an encrypted message indicating whether the new node is authorized to operate over the network. The existing node may decrypt the encrypted message using the public key to determine whether the new node is authorized to communicate over the network. In certain embodiments, by performing method 300 key manager 120 may verify that a new node is authorized to operate on the network before other components of the system may communicate with the new node. Thus, method 300 maintains and/or improves the security of the network.

FIG. 4 describes a method 400 for adding a new node to the network. In particular embodiments, method 400 may be performed by nodes 105 and/or 110 of system 100. This disclosure contemplates any appropriate node of system 100 performing method 400.

Node 105 may begin by receiving an encrypted first message in step 405. The encrypted first message may be communicated in response to node 105 communicating a request to join the network. The encrypted first message may indicate whether node 105 is authorized to operate on the network.

In step 410, node 105 may decrypt the encrypted first message using a received private key. The private key may be communicated in response to the request to join the network. After decrypting the encrypted first message, node 105 may extract the first message indicating whether node 105 is authorized to operate over the network.

In step 415, node 105 may generate a second message based on the decrypted first message. The second message may indicate whether node 105 is authorized to operate over the network. In particular embodiments, the second message may include a portion of the decrypted first message.

In step 420, node 105 may encrypt the second message using the received private key. After encrypting the second message, node 105 may continue to step 425 to record the encrypted second message to a ledger. In particular embodiments, the ledger may include a record for each component of system 100. Each record may indicate whether the corresponding component is authorized to communicate over the network. In certain embodiments, the ledger may be searched using a public key of node 105. Searching using the public key of node 105 may return the encrypted second message. The encrypted second message may then be decrypted using the public key of node 105 to retrieve the second message. The second message may then be analyzed to determine whether node 105 is authorized to communicate over the network.

Modifications, additions, or omissions may be made to methods 300 and 400 depicted in FIGS. 3 and 4. Methods 300 and 400 may include more, fewer, or other steps. For example, steps may be performed in parallel or in any suitable order. While discussed as key manager 120 and node 105 performing the steps, any suitable component of system 100, such as node 110 or ledger 135 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
a key manager comprising a hardware processor configured to:
generate a private key and a public key of a network node;
communicate the private key and the public key to the network node;
verify whether the network node is authorized to operate on a network;
generate a first message indicating whether the network node is authorized to operate on the network;
encrypt the first message using the public key; and
communicate the encrypted first message to the network node; and the network node configured to:
decrypt the encrypted first message using the private key;
generate a second message based on the first message, the second message indicating whether the network node is authorized to operate on the network;
encrypt the second message using the private key; and
record the encrypted second message to a ledger, wherein the ledger is searchable using the public key to return the encrypted second message.

2. The system of claim 1, wherein verifying whether the network node is authorized to operate on the network comprises one or more of:
verifying an operating system version of the network node;
verifying a patch level of the network node;
verifying that a first user account is associated with the network node;
verifying that a second user account is not associated with the network node;
verifying that a file system is mounted on the network node;
verifying that a security software is installed on the network node;
verifying that a service is connected to the network node.

3. The system of claim 1, wherein the network node is further configured to:
generate a hash of a kernel of the network node; and
communicate the hash to the key manager to identify the network node to the key manager.

4. The system of claim 1, wherein the key manager is further configured to:
determine that a change occurred on the network node; and
in response to the determination that the change occurred, verify whether the network node is authorized to operate on the network.

5. The system of claim 1, wherein the ledger comprises a plurality of records, each record indicating whether a node of the network is authorized to operate on the network.

6. The system of claim 1, wherein a second network node searches the ledger using the public key of the network node to determine whether the network node is authorized to operate on the network before the second network node communicates with the network node.

7. The system of claim 1, wherein:
the network comprises a plurality of network nodes; and each network node of the plurality of network nodes stores a copy of the ledger.

8. The system of claim 1, wherein the second message comprises a portion of the first message.

9. An apparatus comprising:
a memory configured to store:
a private key of a network node; and
a public key of the network node; and
a hardware processor communicatively coupled to the memory, the processor configured to:
generate the private key and the public key of the network node;
communicate the private key and the public key to the network node;
verify whether the network node is authorized to operate on a network;
generate a first message indicating whether the network node is authorized to operate on the network;
encrypt the first message using the public key; and
communicate the encrypted first message to the network node, wherein the network node is configured to:
decrypt the encrypted first message using the private key;
generate a second message based on the first message, the second message indicating whether the network node is authorized to operate on the network;
encrypt the second message using the private key; and
record the encrypted second message to a ledger, wherein the ledger is searchable using the public key to return the encrypted second message.

10. The apparatus of claim 9, wherein verifying whether the network node is authorized to operate on the network comprises one or more of:
verifying an operating apparatus version of the network node;
verifying a patch level of the network node;
verifying that a first user account is associated with the network node;
verifying that a second user account is not associated with the network node;
verifying that a file apparatus is mounted on the network node;
verifying that a security software is installed on the network node;
verifying that a service is connected to the network node.

11. The apparatus of claim 9, wherein the network node is further configured to:
generate a hash of a kernel of the network node; and
communicate the hash to the key manager to identify the network node to the key manager.

12. The apparatus of claim 9, wherein the processor is further configured to:
determine that a change occurred on the network node; and
in response to the determination that the change occurred, verify whether the network node is authorized to operate on the network.

13. The apparatus of claim 9, wherein the ledger comprises a plurality of records, each record indicating whether a node of the network is authorized to operate on the network.

14. The apparatus of claim 9, wherein a second network node searches the ledger using the public key of the network node to determine whether the network node is authorized to operate on the network before the second network node communicates with the network node.

15. The apparatus of claim 9, wherein:
the network comprises a plurality of network nodes; and
each network node of the plurality of network nodes stores a copy of the ledger.

16. A method comprising:
generating a private key and a public key of a network node;
communicating the private key and the public key to the network node;
verifying whether the network node is authorized to operate on a network;
generating a first message indicating whether the network node is authorized to operate on the network;
encrypting the first message using the public key;
communicating the encrypted first message to the network node;
decrypting the encrypted first message using the private key;
generating a second message based on the first message, the second message indicating whether the network node is authorized to operate on the network;
encrypting the second message using the private key; and
recording the encrypted second message to a ledger, wherein the ledger is searchable using the public key to return the encrypted second message.

17. The method of claim 16, wherein verifying whether the network node is authorized to operate on the network comprises one or more of:
verifying an operating method version of the network node;
verifying a patch level of the network node;
verifying that a first user account is associated with the network node;
verifying that a second user account is not associated with the network node;
verifying that a file method is mounted on the network node;
verifying that a security software is installed on the network node;
verifying that a service is connected to the network node.

18. The method of claim 16, further comprising:
generating a hash of a kernel of the network node; and
communicating the hash to the key manager to identify the network node to the key manager.

19. The method of claim 16, further comprising:
determining that a change occurred on the network node; and
in response to the determination that the change occurred, verifying whether the network node is authorized to operate on the network.

20. The method of claim 16, wherein a second network node searches the ledger using the public key of the network node to determine whether the network node is authorized to operate on the network before the second network node communicates with the network node.

* * * * *